A. BECKERS.
STEREOSCOPE.
No. 99,136.  Patented Jan. 25, 1870.
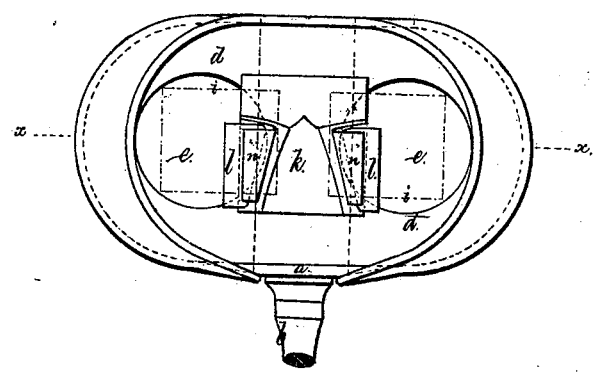
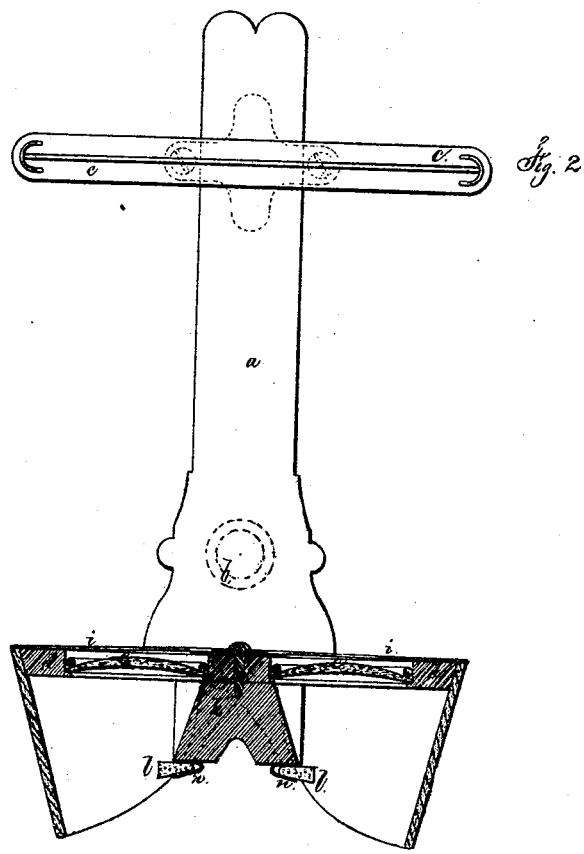

United States Patent Office.

ALEXANDER BECKERS, OF NEW YORK, N. Y.

Letters Patent No. 99,136, dated January 25, 1870.

IMPROVEMENT IN STEREOSCOPES.

The Schedule referred to in these Letters Patent and making part of the same.

*To all whom it may concern:*

Be it known that I, ALEXANDER BECKERS, of the city and State of New York, have invented and made a new and useful Improvement in Stereoscopes; and I do hereby declare the following to be a full, clear, and exact description of the said invention, reference being had the annexed drawing, making part of this specification, wherein—

Figure 1 is an elevation of the eye-piece of the stereoscope, and

Figure 2 is a sectional plan, through the line $x\,x$.

Similar letters denote the same parts.

In stereoscope instruments it has heretofore been usual to introduce a diaphragm to intercept the rays at the left edge of the right picture, and the right edge of the left picture, so that but one picture shall be seen, and that with a complete surrounding border. With this character of instrument there is a definite and harsh edge that is apparent, in consequence of the diaphragm being between the lenses and the picture, and hence being visible with the picture.

The nature of my said invention consists in a diaphragm placed between the lenses and the eye, so as to cut off the rays of light from the side pictures, and prevent portions of them appearing; and in said diaphragm being near the eye instead of near the focus of the picture. The rays are so blended that there does not appear to be any sharp lines to the edges of the diaphragm, but the pictures appear to be blended. To aid in shading the rays, the diaphragm is made of colored glass, adjustable to suit different sights, and the edge of the glass is made the thickest, to divert or disperse the rays of light that pass through the glass to the eye.

In the drawing—

*a* represents a stand, provided with a handle, a portion of which is shown at *b*, and *c* is the picture-holder. These may be of any desired size or character, and I remark that although my improvement is shown in connection with an open stereoscope instrument, it may be applied to a camera.

*d* is a lens-holder, in which are introduce the lenses *e e*, that are concave, convex, or "meniscus."

I employ the entire circular lens, and make use of a diaphragm, *i*, placed immediately behind, to exclude from the field of the lenses such objects as might otherwise appear around the picture.

The lens-holder *d* is provided with a hood, to set against the forehead of the person using the instrument, and within this, and between the lenses *e*, is the projection *h*, forming the diaphragm for intercepting the rays of light from the middle portion of the pictures, where they come together, so that only one picture can be seen as aforesaid.

If the instrument was to be used by only one person, the width of this diaphragm might not require to be varied, but in consequence of the varying distances between the centres of the eyes in different persons, I make use of adjustable edges to the diaphragm *k*, and I find that the pieces of green glass, *l*, held in the sheet-metal clip *n* are preferrable.

I also find that these pieces of glass, when ground so as to be the thickest at the outer edge, answer the best in softening or shading the rays of light as they pass through the glass to the eye.

By moving these pieces of glass, *l*, the instrument is made to suit the sight of different persons.

This translucent diaphragm, when made adjustable as set forth, might be used between the lens and the picture, to shade or soften the rays of light, and prevent portions of both pictures being seen with each eye, so that but one complete image will be visible.

What I claim, and desire to secure by Letters Patent, is—

1. Introducing the diaphragm between the lenses and the eye, in a stereoscope instrument, substantially as and for the purposes set forth.

2. Adjusting the width of the diaphragm that is between the lenses and the eyes of the person using the stereoscope, for the purposes set forth.

3. An adjustable diaphragm of ground glass or other translucent material, to intercept and soften the rays of light, in the manner and for the purposes set forth.

4. A diaphragm of glass or other translucent material, made with the vertical edges where the rays of light are intercepted, the thickest, and combined with a stereoscope instrument, substantially as and for the purposes set forth.

In witness whereof, I have hereunto set my signature, this 7th day of July, A. D. 1869.

ALEX. BECKERS.

Witnesses:
CHAS. H. SMITH,
GEO. T. PINCKNEY.